Dec. 6, 1927.  
E. A. BROWN  
1,652,088  
TIRE CONSTRUCTION  
Filed Nov. 12, 1923  
2 Sheets-Sheet 1
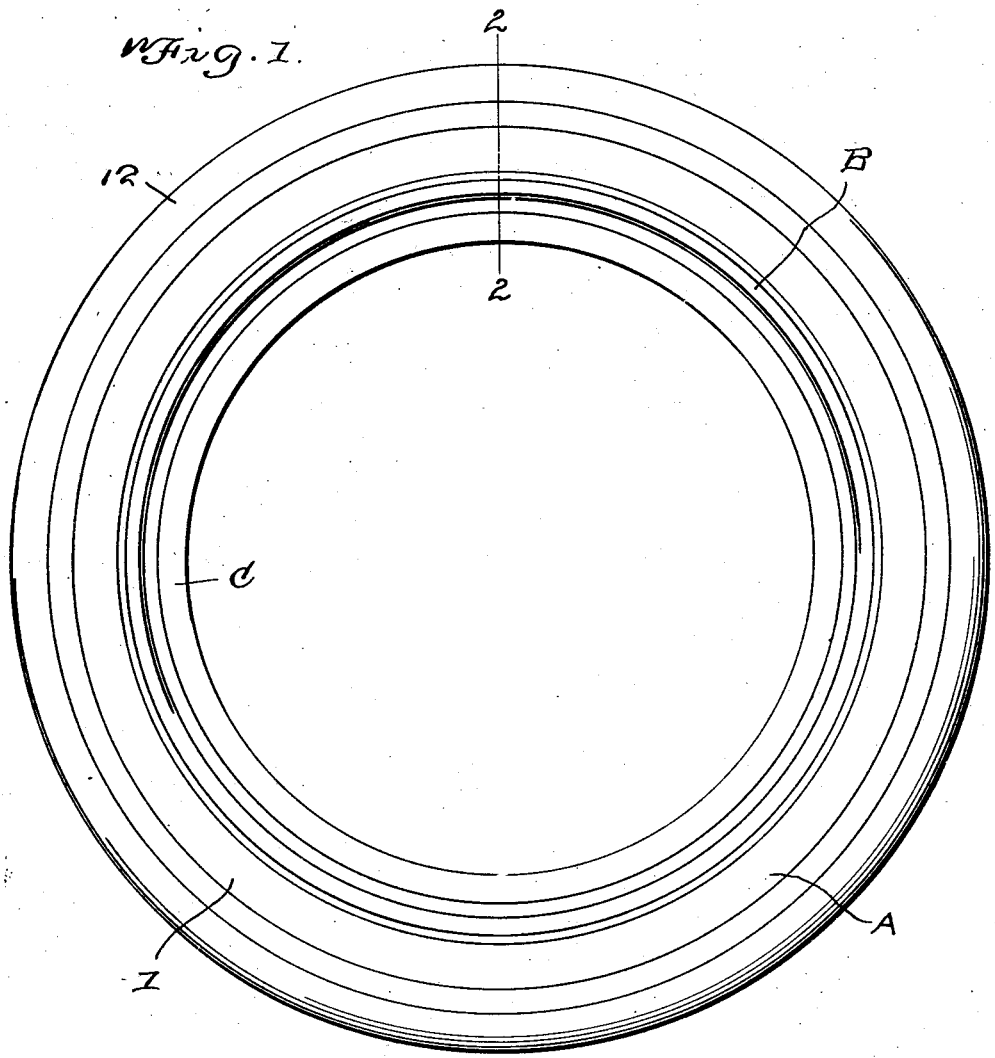
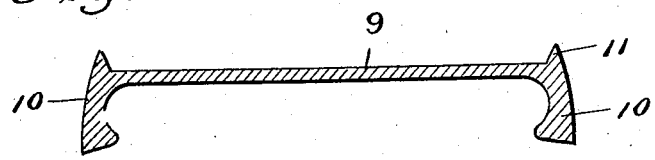

Dec. 6, 1927.
E. A. BROWN
1,652,088
TIRE CONSTRUCTION
Filed Nov. 12, 1923
2 Sheets-Sheet 2
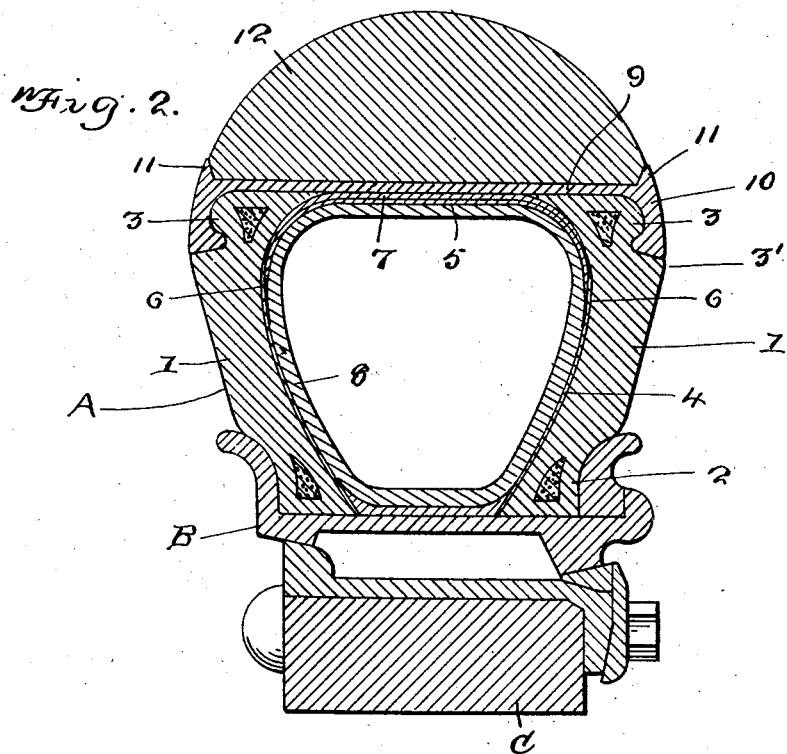
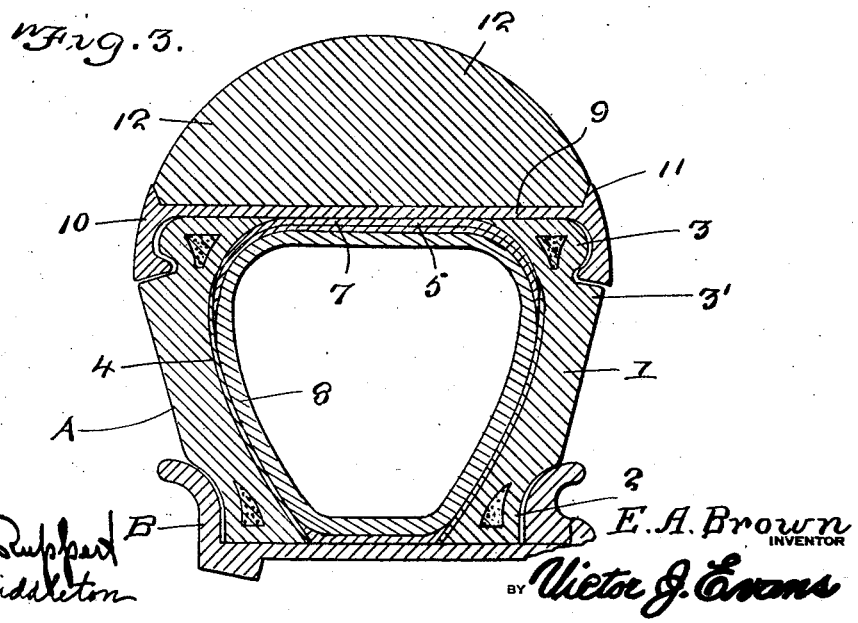

Patented Dec. 6, 1927.

1,652,088

UNITED STATES PATENT OFFICE.

ERNEST A. BROWN, OF SPRINGFIELD, OHIO.

TIRE CONSTRUCTION.

Application filed November 12, 1923. Serial No. 674,362.

This invention relates to an improved tire for motor vehicles and the like, the general object of the invention being to provide means for attaching a solid tire to the tread section of a pneumatic tire so as to prevent blow-outs and punctures of the pneumatic tire.

Another object of the invention is to provide a metal ring-member for attaching the solid tire to the pneumatic tire and to so form said member that it will prevent the walls of the pneumatic tire from coming in contact with curbs and the walls of ruts and the like.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a side view of a wheel showing the invention in use.

Figure 2 is an enlarged section on line 2—2 of Figure 1.

Figure 3 is an enlarged sectional detail view of the improved tire.

Figure 4 is a similar detail view of the metal ring member.

As shown in these views, the pneumatic casing A consists of the side members 1 having the beads 2 at their inner edges and the beads 3 at their outer edges, the lining 4 which is vulcanized to the side members and the outer lining 5 which is separated from the casing at the points 6 so that the beads 3 can spread apart when the tire is inflated. The tread portion of the lining 5 has a thin coating of rubber, as shown at 7. The inner tube 8 is inserted in the casing in the usual manner and is similar to the tubes now in use. The inner beads 2 engage the usual sectional rim B which is carried by the felly C of the wheel and a metal ring-like member 9, preferably formed of aluminum, has its edges formed of the curved flanges 10 for engaging the beads 3 and with the outer beveled flanges 11 for holding a solid tire 12 thereon. The beads 3 are provided with the parts 3' for enclosing the inner edges of the flanges 10 and the flanged edges of the member 9 are curved so that they will extend beyond the outer walls of the side members 1 so as to protect said members 1 from being damaged by striking curbs, the walls of ruts and the like. The flanges 10 and the beads 3 are of the clincher type.

From the foregoing it will be seen that I have provided a tire which combines the advantages of a solid tire with the pneumatic tire and the device is practically puncture proof and blow-out proof. When the inner tube is inflated the beads 3 will be pressed away from each other so as to engage the flanges 10 and this is rendered possible by having the beads free of the lining.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A tire of the class described, comprising a casing formed of a pair of side members, each member having a bead at each edge thereof, a lining secured to the inner wall of each side member, a third lining bridging the inner walls of the outer edges of said side members, a thin coating of rubber overlying the third lining, a metal ring member having curved flanges upon its inner perimeter for engaging over and embracing the outer beads on the side members, outer bevelled flanges upon the outer perimeter of the ring, a solid tire arranged upon the ring and fitted between the outer bevelled flanges and said side walls having parts thereof enclosing the inner edges of the curved flanges.

In testimony whereof I affix my signature.

ERNEST A. BROWN.